June 18, 1968  L. A. HOLDER  3,388,451
TOOL FOR INSERTING TIRE STUDS
Filed Dec. 28, 1966

INVENTOR.
LORRAIN A. HOLDER
BY
Meyer, Tilberry & Body
ATTORNEYS

United States Patent Office 3,388,451
Patented June 18, 1968

3,388,451
TOOL FOR INSERTING TIRE STUDS
Lorrain A. Holder, Willoughby Hills, Ohio (% The Die Cast Finishing Co., 4150 Hough Ave., Cleveland Ohio 44103)
Filed Dec. 28, 1966, Ser. No. 605,359
10 Claims. (Cl. 29—235)

This invention pertains to the art of vehicle tires and, more particularly, to a tool for installing tire studs.

Recently there have been developed hardened insert members in the form of studs having a cylindrical shank and an enlarged head, which are adapted to be inserted into openings of smaller diameter than the stud shank preformed in the thread surface of vehicle tires. These studs are inserted so their head ends extend to the bottom of the preformed openings and their shank ends extend a short distance beyond the tread surface to greatly increase the traction of the tire, especially on snow and ice.

Generally these studs had been inserted by the use of relatively complicated and expensive air or electric motor powered tools. However, in my previously filed co-pending application, Ser. No. 536,025 filed Mar. 21, 1966, I have disclosed a tire stud arrangement which eliminates the need for such powered tools, and permits the stud to be inserted by a simple tool with a minimum of effort. The inserting tool disclosed in my previous application comprises a cylindrical member having an opening in one end just large enough to receive the shank of the stud and an outer diameter substantially less than the maximum diameter of the head and preferably as small as possible consistent with adequate strength in the walls of the member defining the opening to receive the shank of the stud.

With a stud positioned with its shank in the tool opening, it is a simple matter to insert the stud in the preformed tread opening. The head of the stud is positioned in axial alignment with the preformed tread opening and an axial force applied to the tool. This causes the head of the stud to dilate the tread opening and be received therein. When the stud has been inserted to the bottom of the tread opening, the tool is withdrawn and the dilated tread opening contracts around the shank and head of the stud and holds it firmly therein.

The present invention constitutes an improvement on my previously disclosed inserting tool, and provides a simple holding means for releasably maintaining the stud within the tool opening without the use of complicated gripping members. Because of the manner in which this means is arranged, the forces applied to insert the stud into the preformed opening are carried by the walls of the stud receiving portion of the tool and none transmitted to the holding means.

In accordance with the present invention, an improved tire stud inserting tool of the general type described is provided. This tool includes stud holding means positioned within the tool's stud shank receiving opening for releasably maintaining the stud therein. The holding means includes a stud contacting end inwardly spaced from the outer end of the shank receiving opening a distance less than the length of the stud shank. Additionally, means are provided to permit the stud contacting end of the holding means to move inwardly of the shank receiving opening when force is applied longitudinally of the stud in a direction toward the opening.

In accordance with a more limited aspect of the invention a tire stud inserting tool of the general type described is provided having an improved handle assembly for manually applying the necessary stud inserting forces. This handle assembly comprises an elongated force transmitting member extending inwardly from the stud holding portion of the tool, and a first, pistol-grip type handle member connected to the outer end thereof. Additionally, a second handle member is mounted to extend laterally from the force transmitting member at a location between the pistol-grip type handle member and the stud holding portion of the tool.

The primary object of the present invention is the provision of a tire stud inserting tool provided with a simple arrangement for holding the stud.

Another object is the provision of a stud inserting tool which is extremely simple and inexpensive to manufacture.

A further object is the provision of a tire stud inserting tool that is provided with a holding means for releasably maintaining the stud in the tool's stud shank receiving opening in a manner which does not permit the stud inserting forces to be transmitted to the holding means.

An additional object is the provision of a tire stud inserting tool having a handle arrangement that greatly facilitates the manual application of the necessary stud inserting forces.

These and other objects and advantages will become apparent from the following description used to illustrate the preferred embodiment of the invention as read in connection with the accompanying drawing in which.

Figure 1:
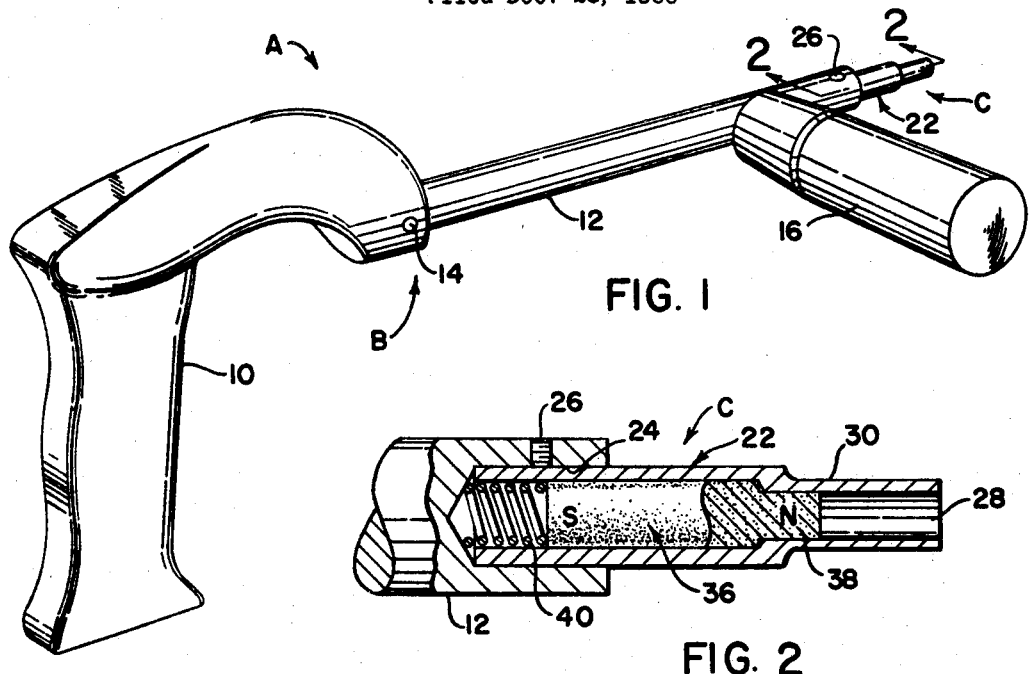
FIGURE 1 is a pictorial view of the tire stud inserting tool constructed according to the preferred embodiment of the present invention.

Referring now to the drawings wherein the showings are for the purpose of illustrating a preferred embodiment of the invention only and not for the purpose of limiting same, FIGURE 1 shows the overall arrangement of the stud inserting tool A, comprised of a handle assembly B and stud holding and inserting assembly C.

Handle assembly B could take a variety of forms; however, the arrangement shown in FIGURE 1 is preferred because it permits the user to apply the necessary stud inserting forces in an easy and comfortable manner. As shown, this assembly preferably comprises a pistol grip handle 10, formed such as by casting, and having an elongated force transmitting member in the form of a rigid steel shaft 12 releasably connected thereto such as by a set screw 14. A second handle 16 extends laterally from the side of shaft 12. Handle 16 is connected to shaft 12 by a threaded stud formed on the end of the handle and received in a threaded opening extending through shaft 12. As can be seen, this permits the handle to be screwed into either side of the shaft in accordance with the desires of the user.

Figure 2:
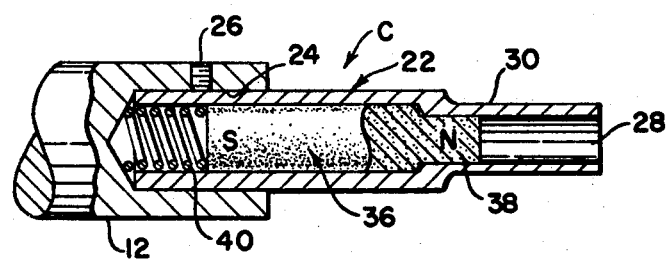
FIGURE 2 is a cross-sectional view taken on line 2—2 of FIGURE 1, and showing the stud holding and inserting assembly.
Figure 3:
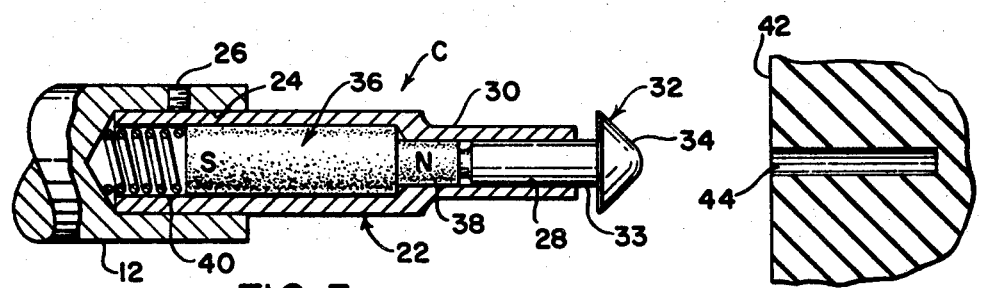
FIGURE 3 is a cross-sectional view of the stud holding and inserting assembly showing a stud about to be positioned in a preformed opening in a tire tread.
Figure 4:
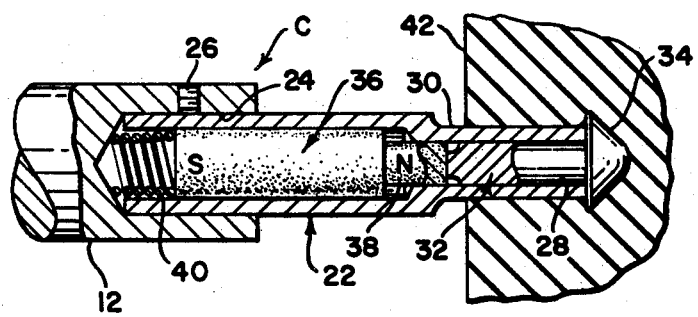
FIGURE 4 is a cross-sectional view showing the stud holding assembly and stud in position in the tire tread.

The stud holding and inserting assembly C is mounted in a suitable opening 124 formed in the right end of shaft 12. Assembly C is preferably releasably secured in the opening, such as by a set screw 26. This permits assembly C to be removed for repair or for insertion of an assembly designed to insert a different size stud. As best shown in FIGURE 2, assembly C includes a cylindrical tubular barrel member 22, preferably formed from a rigid non-magnetic material, such as certain of the stainless steels. The left end of member 22 is of a diameter to conveniently fit opening 24. The right end of member 22 is provided with a reduced diameter portion 30 having a stud receiving opening 28 formed therein. Opening 28 is of a size to closely fit shank 33 of a tire stud 32. Although the device could be used to insert substantially any type of tire stud, as shown in FIGURES 3 and 4, the tire stud 32 is preferably formed in accordance with the teaching of my co-pending application, Ser. No. 536,025 filed Mar. 21, 1966. In the preferred embodiment the shank 33 of stud 32 has a diameter of 0.200". For a shank of this size, opening 28 is preferably approximately 0.210" in diameter.

The outer diameter of the reduced end portion 30 of member 22 is as small as possible, consistent with a wall thickness having strength adequate so as not to bend or fracture when studs are being inserted into the preformed tire opening. As can be seen from FIGURE 4, the length of outer end portion 30 should be at least as great as the depth of preformed opening 44, less the length of stud head 34.

Of particular importance to the present invention is the means used to releasably hold stud 32 in opening 22. This means could be constructed in a variety of ways; however, according to the preferred embodiment, it includes a magnet 36 slidably positioned within the enlarged left end of member 22. The north and south poles of the magnet are indicated by the letters N and S; however, the magnet can be positioned with the poles in either direction. A reduced portion 38 of magnet 36 extends outwardly into opening 28 a distance sufficient to permit its end portion to contact the end of the shank of stud 32 positioned in the opening. A spring 40 is provided to bias magnet 36 outwardly to normally maintain it in the position shown in FIGURE 3. As is apparent, outward movement of the magnet is limited by the inner shoulder formed in member 22. In this manner, magnet 36 is maintained in a position where it can readily magnetically attract and hold the stud. This permits the tool, with a stud positioned therein, to be utilized in any position, even vertically downward, without requiring that the stud be manually maintained in the tool opening. Thus, one hand of the operator does not have to be used to maintain the stud in the tool opening while the tool and stud are brought into alignment with the preformed opening of the tire tread. This permits both hands of the operator to be maintained on the handles 10 and 16 throughout the positioning and inserting steps of the operation. This speeds up the overall operation, since the operator does not have to shift one hand from a stud holding and aligning, to a force applying position with each stud insertion.

Another feature of the stud holding assembly which is of importance to the present invention is the relationship of the combined length of the stud shank 33, magnet 36, and spring 40 in its totally compressed condition, to the length of the internal opening extending from the outer end of portion 30 to the bottom wall of opening 24. The importance of this relationship can best be seen by reference to FIGURES 3 and 4.

As shown in FIGURE 3, as the tool, with a stud positioned therein, is brought into position adjacent preformed opening 44 of tire tread 42, spring 40 maintains magnet 36 and stud 32 biased outwardly. However, as the head 34 of the stud contacts the outer edge of the preformed opening and the operator begins to apply force to cause the head to dilate the tread and insert the stud, the stud and magnet will be moved back against the bias of spring 40. This permits the back of the stud head to contact the end of portion 30 (as shown in FIGURE 4) and the necessary insertion forces transmitted directly through the walls of portion 30 to the stud. If the combined length of shank 33, magnet 36, and spring 40 in its totally compressed condition is less than the total length of the opening from the outer end of portion 30 to the bottom wall of opening 24, then the insertion forces can never be transmitted through magnet 36. This permits the magnet to be formed from magnetic materials of relatively low physical strength, but high magnetic strength. Additionally, the insertion forces are applied to the stud in a more satisfactory manner than would be the case if they were transmitted through the magnet. Note that if the forces were applied through the magnet they would be concentrated over a relatively small area of the outer end of the shank. If this end were not perfectly square with the shank there would be a possibility of high stress concentrations on both the magnet and the stud end. Further, if there were slight variations in stud diameter and length, the stud could be tilted relative the tool resulting in faulty insertion in the tread. However, by the present arrangement these slight variations can have no effect on the position of the stud in the tool opening during the time the insertion forces are applied, since during this time the back of the stud head is always firmly in contact with the end of portion 30.

As can be seen from the above description, an extremely simple tool for inserting tire studs has been provided. Because of the unique stud holding arrangement provided, the insertion of tire studs is greatly facilitated.

The invention has been described in great detail sufficient to enable one skilled in the art of vehicle tires to duplicate the invention. Obviously, modifications and alterations of the preferred embodiment described will occur to others upon a reading and understanding of this specification and it is my intention to include all such modifications and alterations as part of my invention insofar as they come within the scope of the appended claims.

Having thus described my invention, I claim:

1. In a tool for inserting studs of the type having an elongated shank and an enlarged head portion into pre-formed openings in vehicle tires, said tool including an elongated stud receiving end portion having an inwardly extending opening with a bottom wall at a depth greater than the length of said stud shank and a cross-sectional configuration to closely receive the shank of said stud, and with the outer periphery of said end portion being of a lesser size than the enlarged head portion of said stud, the improvement comprising: stud holding means positioned within said inwardly extending opening for releasably maintaining a stud therein, said means including a stud contacting end inwardly spaced from the outer end of said opening a distance less than the length of the shank of said stud, and second means for permitting said inwardly spaced end to move inwardly of said opening when force is applied longitudinally of said stud in a direction toward the bottom of said opening.

2. The improvement as defined in claim 1 wherein said second means includes a spring positioned between the bottom of said opening and said stud contacting end.

3. The improvement as defined in claim 1 wherein said elongated stud receiving end portion is formed from non-magnetic material and said stud holding means includes a magnet.

4. The improvement as defined in claim 3 wherein said second means includes a spring positioned between the bottom of said opening and said magnet.

5. The improvement as defined in claim 3 wherein said magnet is slidable in said opening and has a shoulder formed thereon which cooperates with a shoulder formed interiorly of said opening to thereby limit the outward movement of said magnet.

6. The improvement as defined in claim 5 wherein said second means includes a resilient member positioned between the bottom of said opening and said magnet.

7. The improvement as defined in claim 6 wherein the combined length of said magnet, said resilient means in its totally compressed condition, and said stud shank, is less than the depth of said opening.

8. In a tool for inserting studs of the type having an elongated shank and an enlarged head portion into pre-formed openings in vehicle tires, said tool including an elongated stud receiving end portion having an inwardly extending opening with a bottom wall at a depth greater than the length of said stud shank and a cross-sectional configuration to closely receive the shank of said stud, and with the outer periphery of said end portion being of a lesser size than the enlarged head portion of said stud, the improvement comprising: an elongated rigid force transmitting member extending rearwardly from said elongated stud receiving end portion; a first pistol-grip type handle connected to the outer end of said member; and a second laterally extending handle positioned on said member at a location intermediate said first handle and said stud receiving end portion.

9. The improvement as defined in claim 8 wherein said second handle is releasably secured to said member by means for permitting it to be selectively positioned on opposite lateral sides of said member.

10. The improvement as defined in claim 8 wherein said means includes a threaded opening extending through said member and a threaded stud extending from said handle into engagement with said threaded opening.

References Cited

UNITED STATES PATENTS 3,348,291   10/1967   Niedzwiecki _____ 29—212 X

FOREIGN PATENTS 732,437   4/1966   Canada.

OTHELL M. SIMPSON, *Primary Examiner.*